US010941797B2

(12) United States Patent
Cassaday et al.

(10) Patent No.: US 10,941,797 B2
(45) Date of Patent: Mar. 9, 2021

(54) TELESCOPING MECHANISM

(71) Applicant: ERGO-INDUSTRIAL SEATING SYSTEMS INC., Mississauga (CA)

(72) Inventors: Terry Cassaday, Toronto (CA); Robert Michael Johnston, Cambridge (CA); Robert Zakhour, Toronto (CA); Miles Keller, Toronto (CA)

(73) Assignee: ERGOCENTRIC INC., Mississauga (CA)

( * ) Notice: Subject to any disclaimer, the term of this patent is extended or adjusted under 35 U.S.C. 154(b) by 0 days.

(21) Appl. No.: 16/260,069

(22) Filed: Jan. 28, 2019

(65) Prior Publication Data

US 2019/0257336 A1   Aug. 22, 2019

Related U.S. Application Data

(63) Continuation of application No. 15/222,106, filed on Jul. 28, 2016, now Pat. No. 9,848,707.

(30) Foreign Application Priority Data

Jul. 24, 2017   (CA) ............................... 2017/050884

(51) Int. Cl.
| | | |
|---|---|---|
| *A47C 7/54* | (2006.01) | |
| *A47C 1/03* | (2006.01) | |
| *F16B 7/10* | (2006.01) | |
| *F16B 7/14* | (2006.01) | |
| *A47C 7/40* | (2006.01) | |

(52) U.S. Cl.
CPC ................ *F16B 7/105* (2013.01); *A47C 1/03* (2013.01); *A47C 1/0303* (2018.08); *A47C 1/0305* (2018.08); *A47C 7/402* (2013.01); *F16B 7/1418* (2013.01)

(58) Field of Classification Search
CPC .......... A47C 7/54; A47C 7/402; A47C 1/0303; F16B 7/105; F16B 7/1418
USPC ................................ 297/353, 411.35, 411.36
See application file for complete search history.

(56) References Cited

U.S. PATENT DOCUMENTS

| | | |
|---|---|---|
| 5,318,347 A | 6/1994 | Tseng |
| 5,324,096 A | 6/1994 | Schultz |
| 5,664,842 A | 9/1997 | Tseng |
| 5,997,093 A | 12/1999 | Gollin et al. |

(Continued)

FOREIGN PATENT DOCUMENTS

| | | |
|---|---|---|
| CA | 1252707 A1 | 4/1989 |
| CN | 2371874 Y | 4/2000 |

(Continued)

OTHER PUBLICATIONS

International Search Report dated Oct. 12, 2017 for PCT/CA2017/050884.

*Primary Examiner* — Rodney B White
(74) *Attorney, Agent, or Firm* — Millman IP Inc.

(57) ABSTRACT

In an aspect, provided is an adjustable telescoping assembly. The adjustable telescoping assembly comprises a first support member and a second support member that is slidable upon the first support member and which defines an interior volume. At least one damping element is provided that extends from outside the second support member, through the second support member into the interior volume and engages the first support member.

4 Claims, 12 Drawing Sheets

(56) References Cited

U.S. PATENT DOCUMENTS

| | | | | |
|---|---|---|---|---|
| 6,053,578 | A | * | 4/2000 | van Hekken ............ A47C 1/03 297/411.35 |
| 6,709,059 | B1 | * | 3/2004 | Cvek ...................... A47C 7/402 297/353 |
| 6,827,406 | B2 | * | 12/2004 | Marini ..................... A47C 1/03 297/411.36 |
| 6,896,333 | B1 | | 5/2005 | Matern et al. |
| 7,837,269 | B2 | * | 11/2010 | Bock ........................ A47C 1/03 297/411.35 |
| 9,848,707 | B1 | * | 12/2017 | Cassaday ................. F16B 7/105 |
| 2004/0095008 | A1 | * | 5/2004 | Marini ..................... A47C 1/03 297/411.35 |
| 2008/0296955 | A1 | * | 12/2008 | Geister .................... A47C 1/03 297/411.36 |
| 2015/0130250 | A1 | | 5/2015 | Masunaga et al. |

FOREIGN PATENT DOCUMENTS

| | | |
|---|---|---|
| CN | 2596865 Y | 1/2004 |
| CN | 2682929 Y | 3/2005 |
| CN | 202681218 U | 1/2013 |
| CN | 204889281 U | 12/2015 |
| JP | 10113252 A | 5/1998 |
| KR | 200202412 Y1 | 11/2000 |

* cited by examiner

TELESCOPING MECHANISM

FIELD

The present disclosure relates to the field of telescoping mechanisms, and in particular to an adjustable telescoping armrest as may be implemented on an office chair having one or more adjustable features.

BACKGROUND

Telescoping mechanisms find wide application in a multitude of industries. The ability to customize a device based on built-in telescoping mechanisms provides for flexibility and adaptability that could otherwise necessitate wasteful duplication of devices having only minor dimensional differences.

An industry that has readily adopted the adaptability of telescoping mechanisms is the furniture industry, in particular with respect to ergonomics in office chairs. It has long been recognized that repetitive strain injuries occurring in the workplace can be lessened by incorporating ergonomic features into the equipment and furniture used by the worker. Within the office environment, the evolution of the office chair is a prime example of how ergonomic design has influenced development, with modern chairs now being highly adjustable to accommodate a wide range of potential users.

For typists and computer users, proper arm height and support is necessary to place the hands in the correct position to engage the keyboard. This is particularly true where the user is required to engage a keyboard for hours at a time, a common occurrence for many occupations. Adjustable armrests are known, that is to provide both vertical and lateral adjustment, but such systems are prone to rattle and undesirable play, which can be distracting, and generally leaves the user with the impression that the chair is of poor quality or improperly adjusted.

It would be desirable to provide a telescoping mechanism, for example an armrest assembly that permits for selectable adjustment, but slides efficiently with minimal rattle and undesirable play between sliding surfaces.

SUMMARY

According to an aspect of the disclosure, provided is an adjustable telescoping assembly. The adjustable telescoping assembly comprises a first support member and a second support member that is slidable upon the first support member and which defines an interior volume. At least one damping element is provided that extends from outside the second support member, through a corresponding damping element aperture on the second support member into the interior volume and engages the first support member.

According to another aspect of the disclosure, provided is an adjustable armrest assembly. The adjustable armrest assembly comprises a first support member and a second support member that includes a second support member body that is slidable upon the first support member. The adjustable armrest assembly also provides an armrest that is supported on the second support member, and an adjustment lock mechanism operable to releasably lock the second support member in a selectable location relative to the first support member. The second support member includes an actuator portion positioned to operate the adjustment lock mechanism and a flexible collar that covers the actuator portion and extends around the second support member body.

BRIEF DESCRIPTION OF THE DRAWINGS

The foregoing and other features and advantages will be apparent from the following description of the disclosure as illustrated in the accompanying drawings. The accompanying drawings, which are incorporated herein and form a part of the specification, further serve to explain the principles of the disclosure and to enable a person skilled in the pertinent art to make and use the disclosure. The drawings are not to scale.

DETAILED DESCRIPTION

Specific embodiments of the present disclosure are now described with reference to the figures, wherein like reference numbers indicate identical or functionally similar elements. The following detailed description is merely exemplary in nature and is not intended to limit the disclosure or the application and uses of the disclosure. Furthermore, there is no intention to be bound by any expressed or implied theory presented in the preceding technical field, background, brief summary or the following detailed description.

The telescoping mechanism of the present disclosure serves to reduce rattle and general play between elements that slide telescopically relative to one another. For ease of explanation, and to demonstrate a particular use of the telescoping mechanism, the telescoping mechanism of the present disclosure is exemplified in the form of a telescoping armrest assembly. It will be appreciated that the telescoping mechanism may be implemented in a wide range of other applications, such as, but not limited to, a wide array of extendable rods (i.e. as used for window cleaning, tree trimming, the 'selfie-stick', etc.) and telescoping tripods (i.e. as used by photographers, surveyors, etc.).

Figure 1:
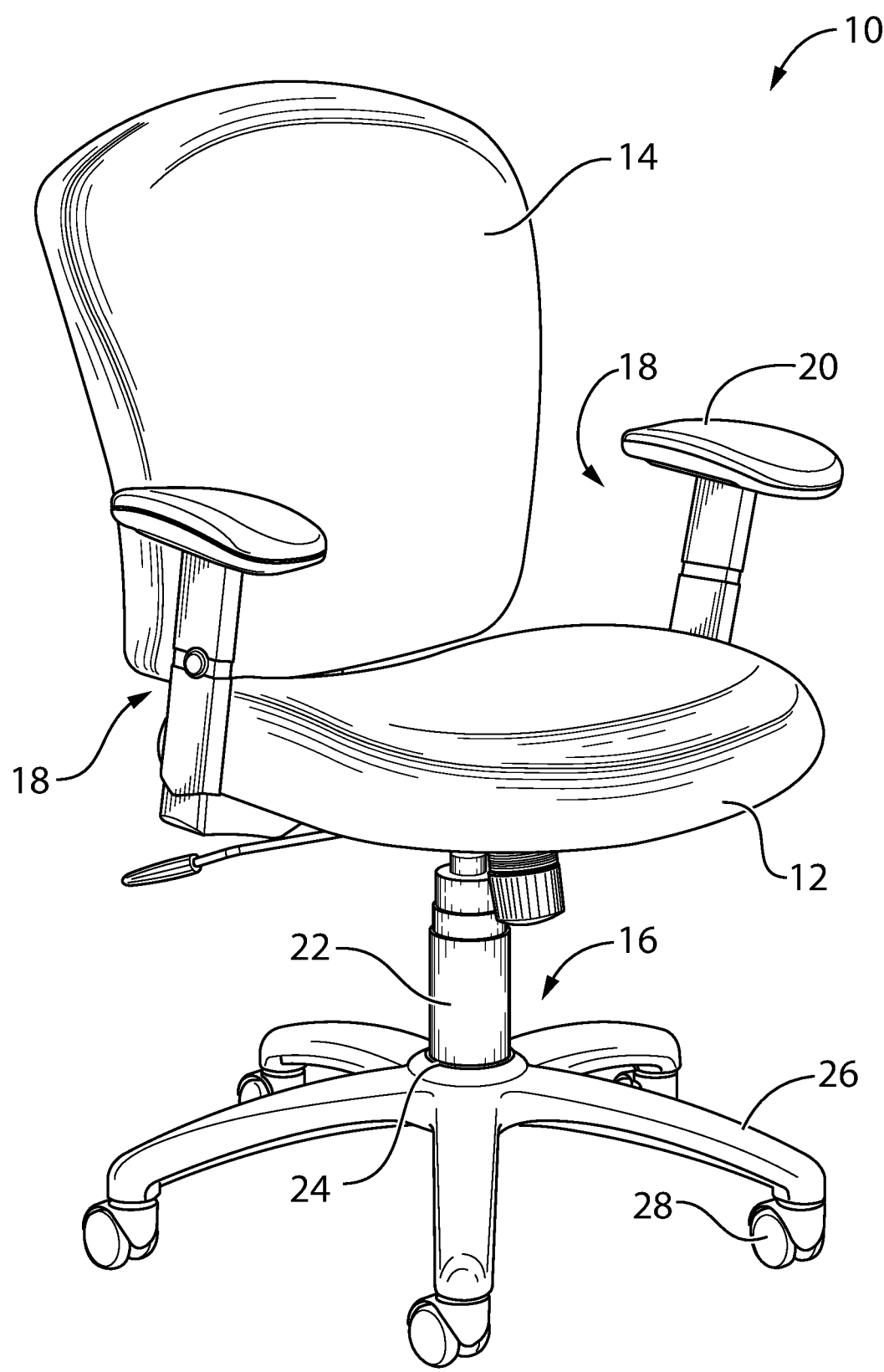
FIG. 1 is perspective view of an office chair incorporating an armrest assembly according to a first embodiment hereof.

Referring now to FIG. 1, shown is a chair 10 presented in the form of an office chair having one or more adjustable features. The chair 10 includes a seat 12, a backrest 14, a leg assembly 16 and a pair of telescoping armrest assemblies 18, each telescoping telescoping armrest assembly 18 supporting a respective armrest pad 20. To facilitate ergonomic adjustment, the seat 12 may be vertically adjustable, for example as provided by a telescoping column 22. The backrest 14 may be provided with a range of adjustability, for example with respect to vertical positioning relative to the seat 12, as well as desired lumbar support. The leg assembly 16 generally provides a base 24 that supports the telescoping column 22, as well as a plurality of leg extensions 26, each configured to support a respective rolling member 28 (e.g. a rolling caster). In the embodiment shown, five leg extensions 26 are provided.

Figure 2A:
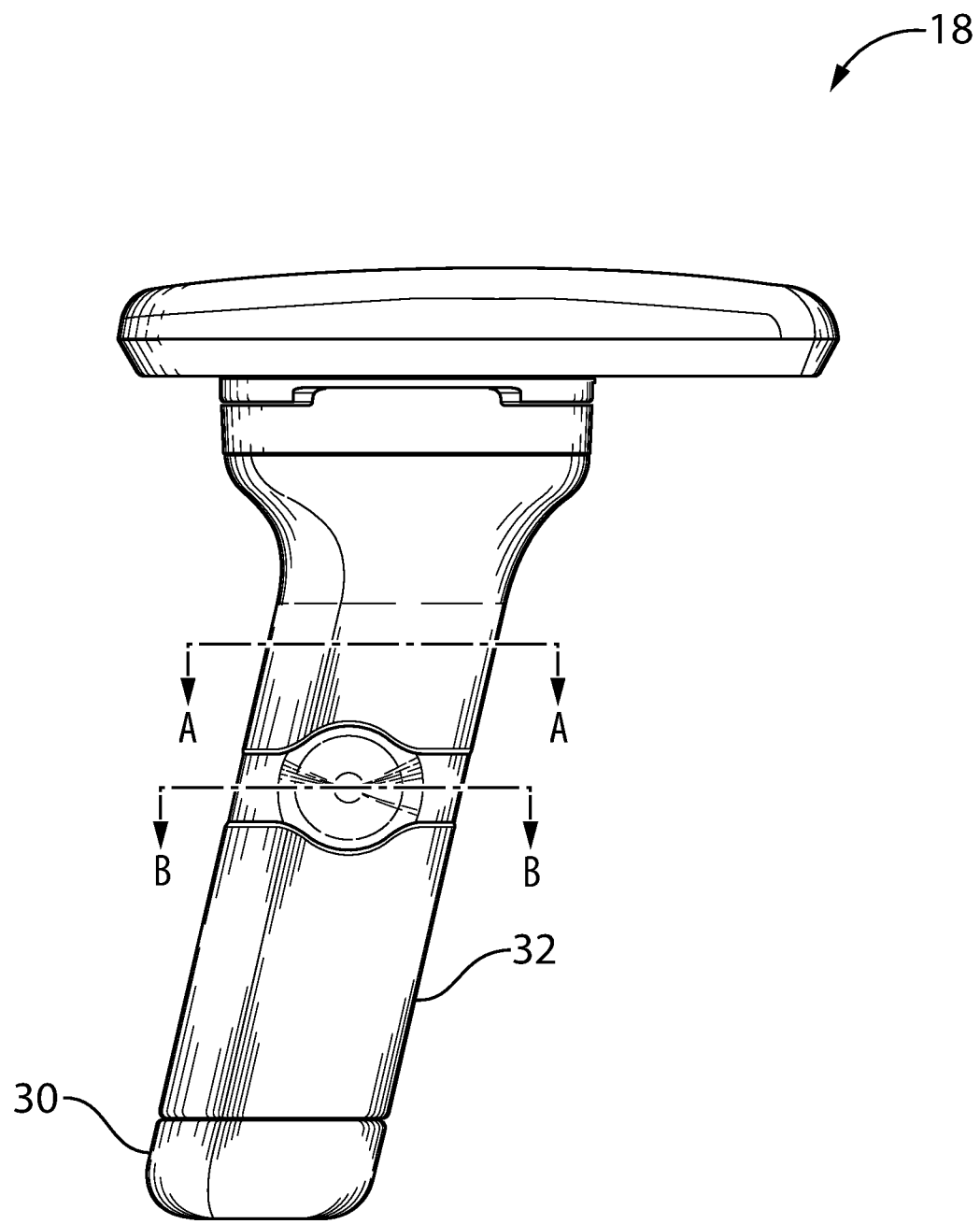
FIG. 2*a* is a side view of the armrest assembly according to the embodiment of FIG. 1, showing the armrest assembly in a lowered position.
Figure 2B:
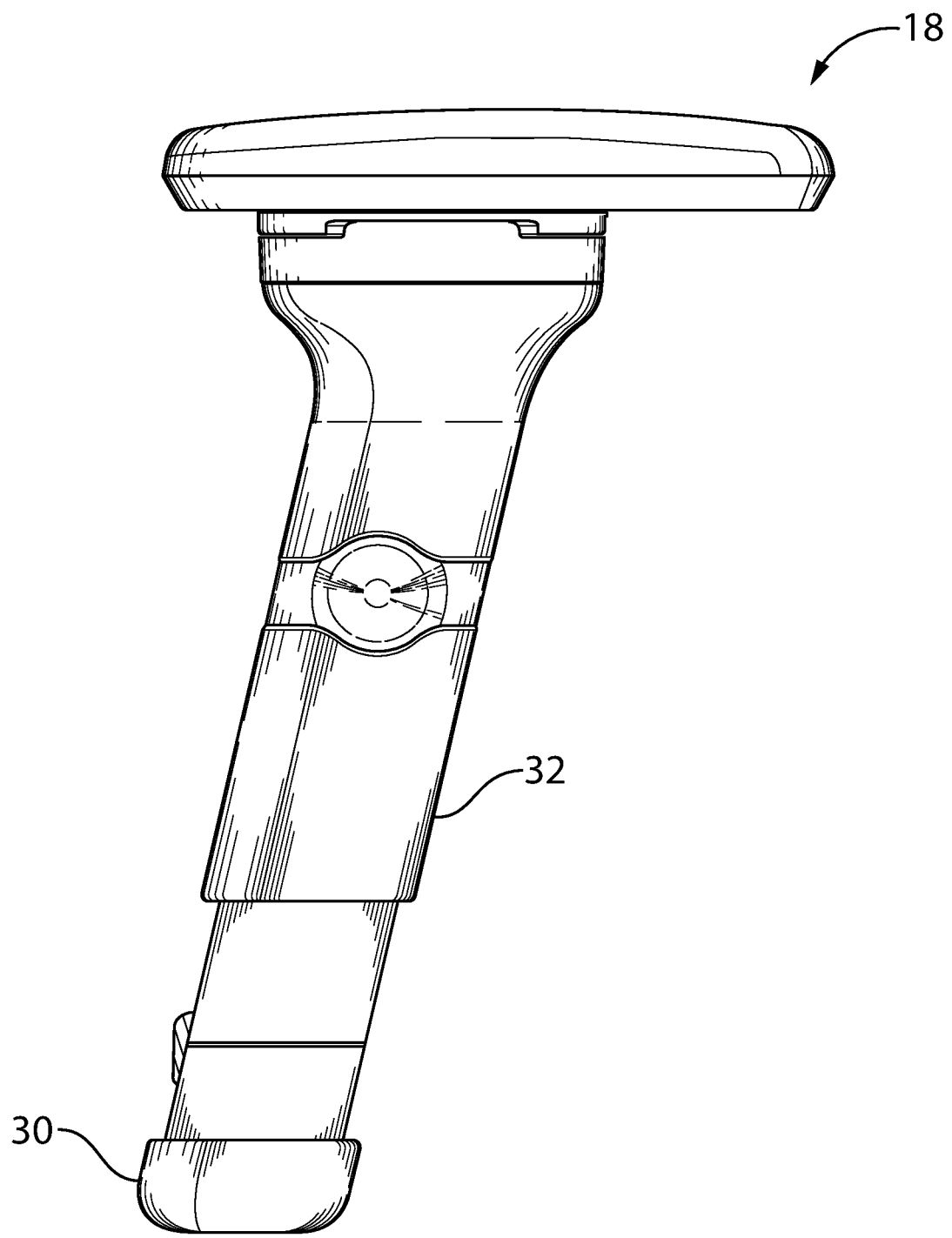
FIG. 2*b* is a side view of the armrest assembly according to the embodiment of FIG. 1, showing the armrest assembly in a raised position.

Each telescoping armrest assembly 18 is vertically adjustable in order to suit a range of users of the chair 10. Having regard to FIGS. 2a and 2b, the telescoping armrest assembly 18 is capable of being adjusted from a first lowered position (FIG. 2a) to a second raised position (FIG. 2b), with a range of intermediate positions being available therebetween. To achieve this, the telescoping armrest assembly 18 includes a first support member 30 and a second support member 32, the second support member 32 being configured to cooperate with the first support member 30 to provide vertical adjustability through a sliding arrangement therebetween. As shown, the second support member 32 provides a second support member body 33 that defines an interior volume, where the second support member 32 is configured to slide upon the first support member 30.

Figure 3:
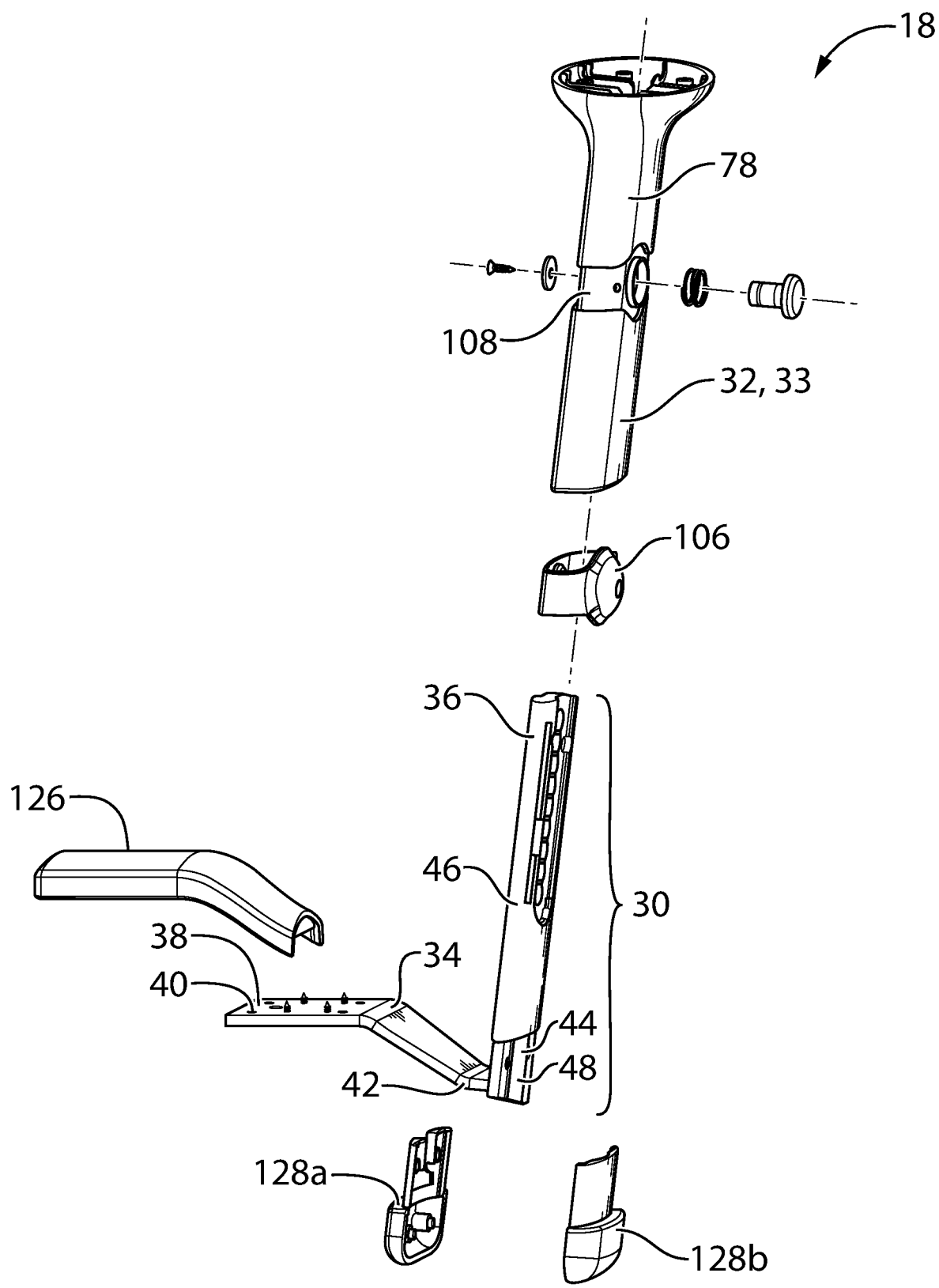
FIG. 3 is an exploded perspective view of the armrest assembly according to the embodiment of FIG. 1 (with the armrest pad removed for clarity).

Referring now to the exploded view of FIG. 3, the first support member 30 includes a lateral support arm 34 configured for attachment to the seat 12 of chair 10 (as shown in FIG. 1), and an upright support arm 36. In the embodiment shown, the lateral support arm 34 presents a seat attachment portion 38 having a plurality of fastener apertures 40 that cooperate with threaded fasteners to fasten the lateral support arm 34 to a rigid support structure (e.g. a frame member) provided on the underside of the seat 12. It will be appreciated that in some embodiments, the seat attachment portion 38 may be attached to a mechanism (not shown) that permits a range of lateral adjustment of the telescoping armrest assembly 18 relative to the seat 12. Opposite the seat attachment portion 38, the lateral support arm 34 presents an upright attachment portion 42 that attaches to the upright support arm 36 of the first support member 30.

As shown, the upright support arm 36 of the first support member 30 includes an internal support member 44 and a bearing sleeve 46. Having regard to FIG. 4 in which the first support member 30 is shown without the bearing sleeve 46, the internal support member 44 is attached at a lateral attachment portion 48 to the upright attachment portion 42 of the lateral support arm 34. The lateral support arm 34 and internal support member 44 are formed of metal (for example a steel or another suitable alloy), with the attachment therebetween generally being achieved through metallurgic bonding (i.e. welding). It will be appreciated that while the lateral support arm 34 and internal support member 44 are represented as separately formed structures that are subsequently attached (i.e. welded) in a generally L-shaped arrangement, they may in an alternative embodiment be unitary in form, that is formed as a one-piece structure, as can be achieved through a metal stamping process.

Figure 4:
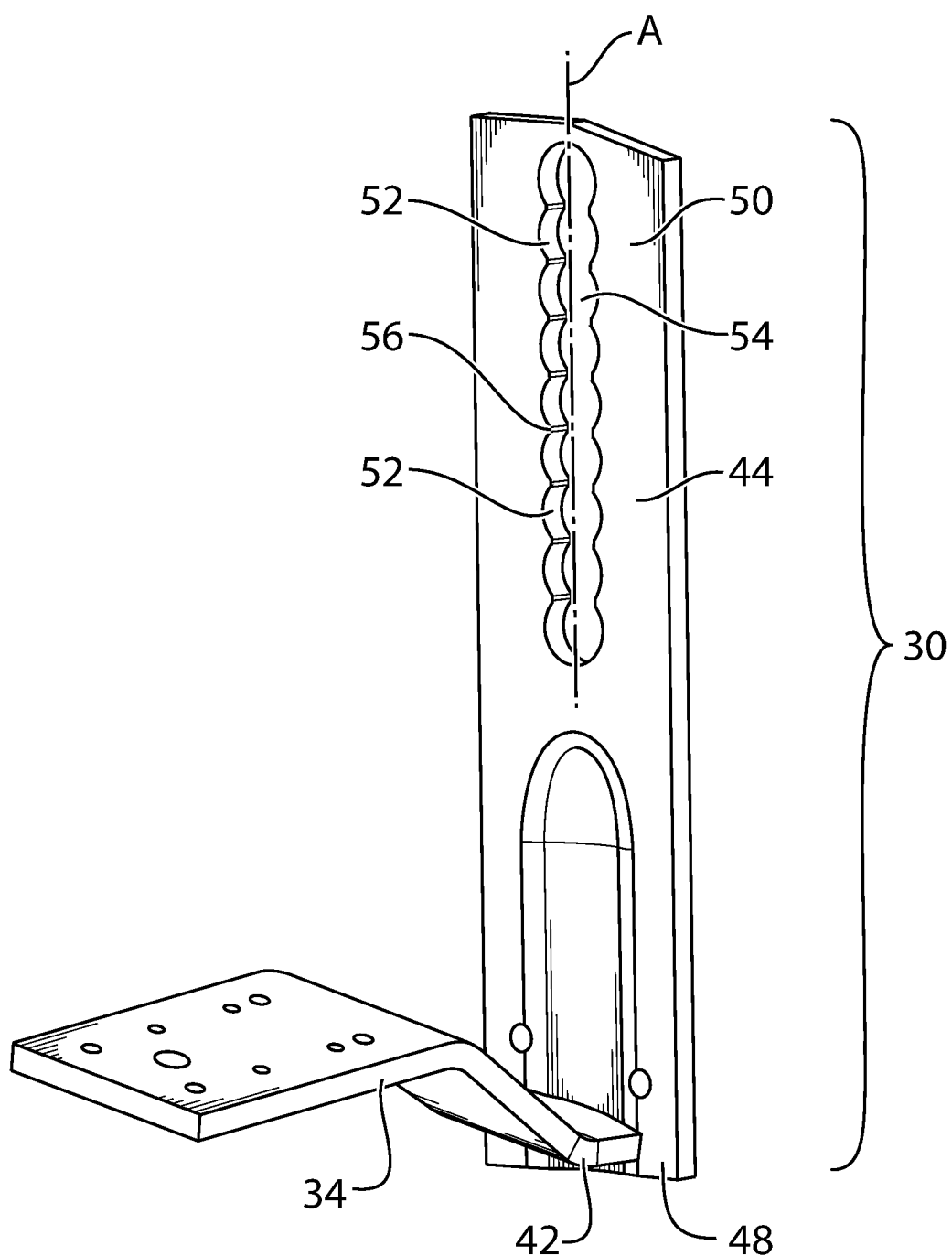
FIG. 4 is a detailed view of the first support member of the armrest assembly according to the embodiment of FIG. 1.

Continuing with FIG. 4, opposite the lateral attachment portion 48, the internal support member 44 provides a lock-channel portion 50. The lock channel portion 50 includes a series of through-holes 52 that cooperate to form a lock channel 54. The through-holes 52 are aligned along a longitudinal axis A of the internal support member 44, with adjacent through-holes 52 partially overlapping so as to define a series of narrowed sections 56 therebetween. The lock channel 50 forms a part of the adjustment lock mechanism as will be described in greater detail below.

Referring back to FIG. 3, the bearing sleeve 46 is configured to cover the internal support member 44 over at least the lock channel portion 50 and a portion of the lateral attachment portion 48. The bearing sleeve 46 may be formed of a suitable thermoplastic material (e.g. a polypropylene or polyethylene) and may be formed directly upon the internal support member 44 by way of a plastic injection overmolding process. It will be appreciated, however, that the bearing sleeve 46 may be separately formed in two or more pieces, and subsequently attached to the internal support member 44. For example, the bearing sleeve 46 may be injection molded in two or more subsections, and attached to the internal support member 44 using suitable fasteners or adhesives.

Figure 5:
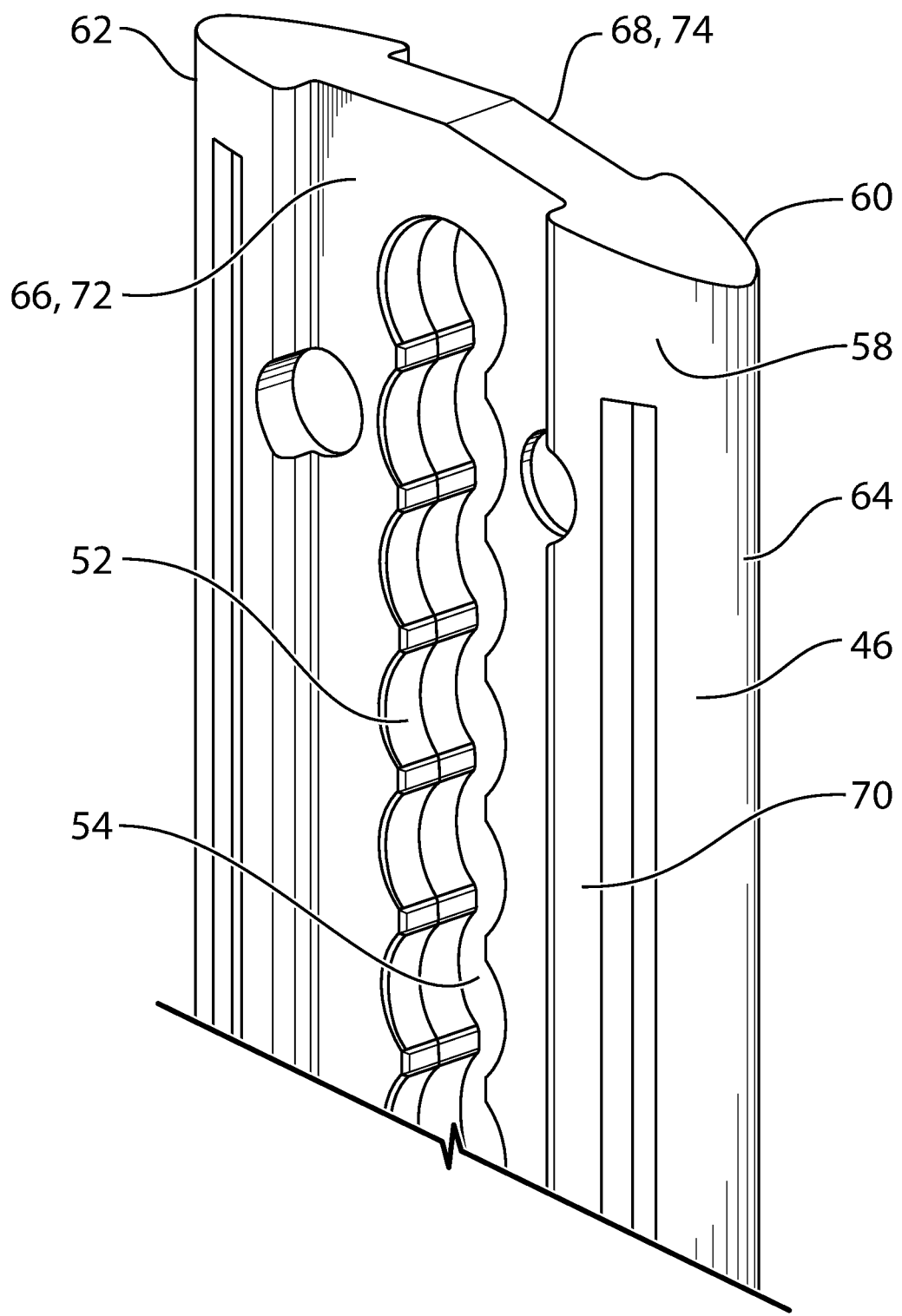
FIG. 5 is a detailed view of the bearing sleeve of the armrest assembly according to the embodiment of FIG. 1.
Figure 6:
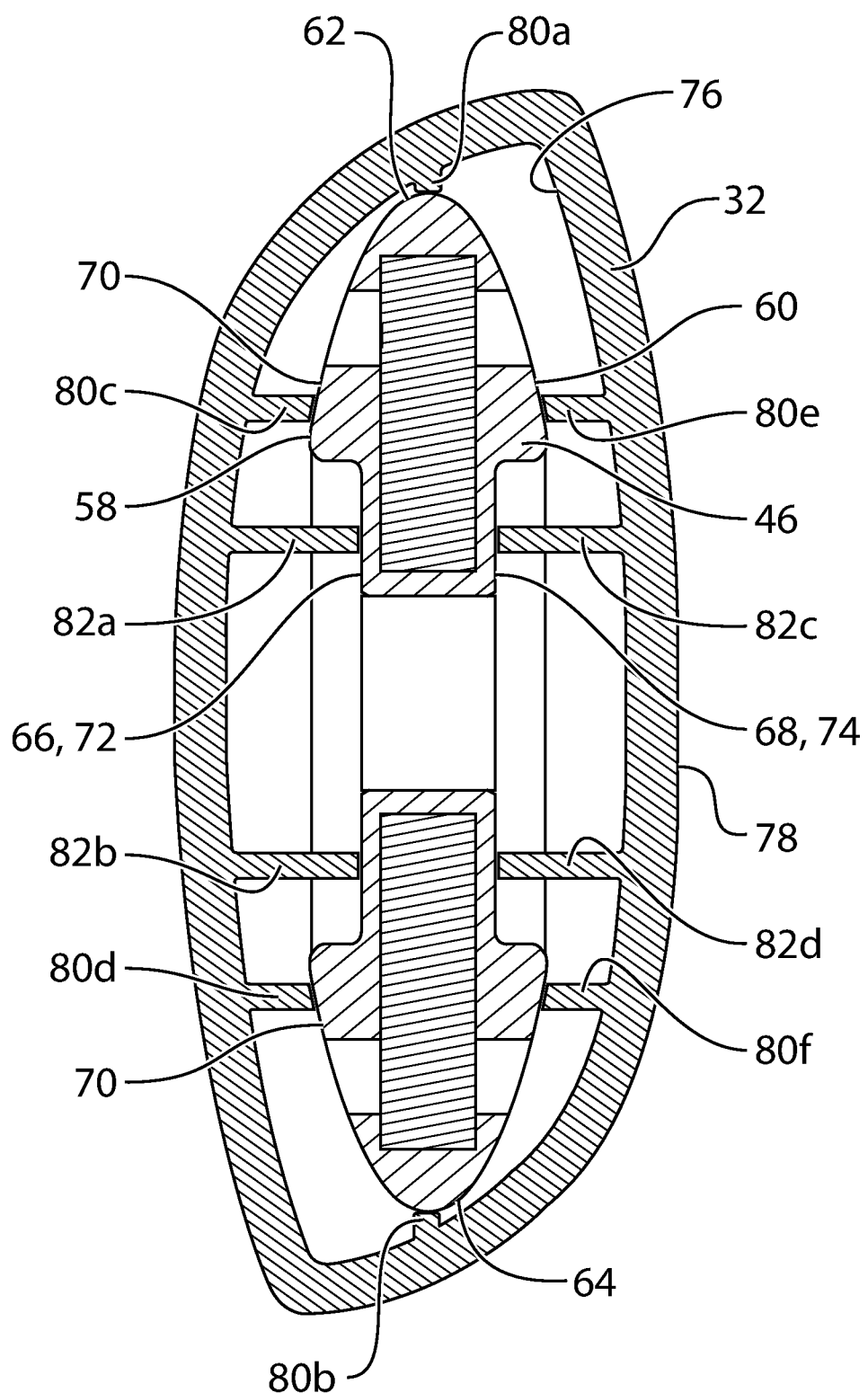
FIG. 6 is a cross-sectional view through line A-A in FIG. 2*a*, showing the relationship between the bearing sleeve and the upper support member of the armrest assembly according to the embodiment of FIG. 1.

Having regard to FIG. 5, the bearing sleeve 46 provides a first side 58 and a second side 60 that interconnect along a first edge 62 and a second edge 64. As shown, the first and second sides 58, 60 additionally interconnect at the through-holes 52 along the length of the lock channel 54 of the internal support member 44, thereby forming a mechanical interlock between the bearing sleeve 46 and the internal support member 44. In the area surrounding the lock channel 54, the first side 58 additionally includes a first recess 66, while the second side 60 additionally includes a second recess 68. Having regard to FIG. 6, the bearing sleeve 46 directly engages the second support member 32 in a sliding relationship, the first and second sides 58, 60 together with the first and second edges 62, 64 define a primary slide surface 70, while the first and second recesses 66, 68 define secondary slide surfaces 72, 74.

The second support member 32 is generally provided in the form of a hollow sleeve having an inside surface 76 and an outside surface 78. Along at least a portion of the longitudinal length of the second support member 32, the inside surface 76 provides a series of primary guide elements 80a, 80b, 80c, 80d, 80e, 80f that bear upon the primary slide surface 70 of the bearing sleeve 46. In the embodiment shown, the primary guide elements 80a, 80b adjacently align and slide relative to the primary slide surface 70 in the region of the first edge 62 and the second edge 64, respectively. The primary guide elements 80c, 80d adjacently align and slide relative to the primary slide surface 70 along the first side 58, while the primary guide elements 80e, 80f adjacently align and slide relative to the primary slide surface 70 along the second side 60. The second support member 32 may additionally include a series of secondary guide elements 82a, 82b, 82c, 82d that bear upon the secondary slide surfaces 72, 74 provided at the first and second recesses 66, 68. As shown, the secondary guide elements 82a, 82b adjacently align and slide relative to the secondary slide surface 72, while the secondary guide elements 82c, 82d adjacently align and slide relative to the secondary slide surface 74. The clearance between the primary and secondary guide elements 80, 82 and the respective primary and secondary slide surfaces 70, 72/74 is established to permit a smooth and interference-free sliding action. In general, the average clearance between adjacently aligned surfaces is in the range of 0.25 to 1 mm, with a preferred average clearance of 0.5 mm. It will be appreciated that with this arrangement, the second support member 32 is slidable upon the first support member 30 through the range of vertical adjustability shown in FIGS. 2A and 2b.

In the embodiment shown, the first and second sides 58, 60 of the bearing sleeve 46 taper towards each other at the first and second edges 62, 64. Accordingly, the arrangement of the primary guide elements 80c, 80e relative to the tapered profile proximal the first edge 62 and the corresponding arrangement of the primary guide elements 80d, 80f relative to the tapered profile proximal the second edge 64 serve to reduce unwanted movement in a direction transverse to the longitudinal plane of the bearing sleeve 46. For example, upon a shift of the first edge 62 of the bearing sleeve 46 towards the primary guide element 80a, the primary guide elements 80c, 80e engage a widening profile between the first and second sides 58, 60 proximal the first edge 62. A similar restriction in movement in the opposing direction is achieved by virtue of primary guide elements 80d, 80f acting upon a widening profile proximal the second edge 64. Accordingly, the overall extent of unwanted transverse movement of the second support member 32 relative to the first support member 30 is reduced.

Figure 7:
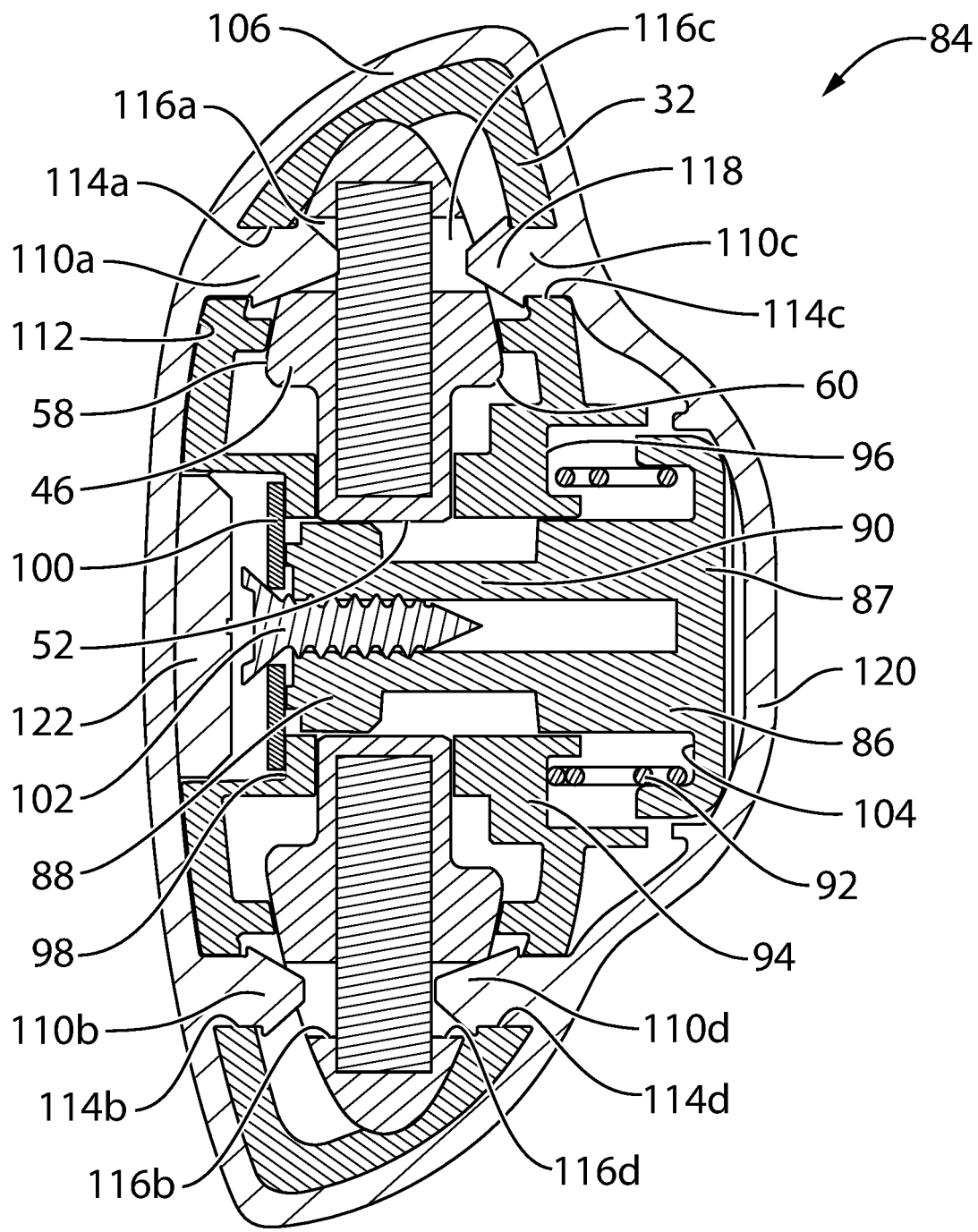
FIG. 7 is a cross-sectional view through line B-B in FIG. 2*a*, detailing the locking mechanism and the flexible collar with damping elements, according to the embodiment of FIG. 1.

Referring now to FIG. 7, the second support member 32 also includes a adjustment lock mechanism 84, operable to releasably lock the second support member 32 in a selectable location relative to the first support member 30. The lock mechanism 84 includes a moveable locking member 86 having an actuator portion 87 that enables operation of the lock mechanism 84. As shown, locking member 86 presents the actuator portion 87 and a locking portion 88 sized to selectively engage one of the through-holes 52 along the lock channel 54 (see FIG. 4). The locking portion 88 is sized to prevent passage through the narrow section 56 (see FIG. 4) of the lock channel 54, thereby maintaining the selected location. The locking member 86 additionally includes a release portion 90 sized to permit movement of the locking member 86 through the narrow section 56 between adjacent through-holes 52, and therein along the lock channel 54 to a select position. The lock mechanism 84 incorporates a biasing member 92 to bias the locking member 86 towards a locked position, where the locking portion 88 is positioned within the select through-hole 52.

The second support member 32 provides a mount 94 for receiving the locking member 86. As shown, the mount 94 includes on one side a recess defining a first seat 96 for receiving the biasing member 92, and on the opposing side, a recess defining a second seat 98 to receive a suitable stop member 100 and fastener 102. As shown, the locking member 86 is provided with an undercut 104 to assist in retaining the biasing member 92 between the locking member 86 and the first seat 96. It will be appreciated that the stop member 100 is dimensioned such that upon being fastened to the locking member 86, it ensures a continued biasing force from the biasing member 92 upon the locking member 86. By the application of force upon the locking member 86 in a direction opposite the biasing force of the biasing member 92, the locking member 86 can be displaced to a released position, where the locking portion 88 is removed from the through-hole, permitting the release portion 90 to slide between the narrowed sections 56.

Referring back to FIG. 3, in the region around the locking mechanism 84, the outside surface 78 of the second support member 32 is adapted to receive an flexible collar 106 within a collar recess 108. The flexible collar 106 is configured to seat and position substantially flush within the collar recess 108 of the second support member body 33. The flexible collar 106 encircles a portion of the second support member body 33 of the second support member 32 and covers the actuator portion 87 of the locking member 86. The flexible collar 106 is pliable, permitting a user to press upon the flexible collar 106 to actuate the locking member 86 when armrest vertical adjustment is necessary.

Having regard to FIG. 7, the flexible collar 106 includes at least one damping element 110a, 110b, 110c, 110d provided on an inside surface 112 thereof. Each damping element 110a, 110b, 110c, 110d extends to the interior volume of the second support member 32 through a respective damping element aperture 114a, 114b, 114c, 114d provided in the collar recess 108 of the second support member 32. As shown, the flexible collar 106 provides four damping elements 110a, 110b, 110c, 110d that align and extend through respective damping element apertures 114a, 114b, 114c, 114d on the second support member 32. Each damping element 110a, 110b, 110c, 110d is adapted to engage a respective damping channel provided on the bearing sleeve 46 of the first support member 30. As shown, the bearing sleeve 46 provides a first damping channel 116a and a second damping channel 116b on the first side 58, and a third damping channel 116c and a forth damping channel 116d on the second side 60. Each damping element 110a, 110b, 110c, 110d includes at the terminus end an enlarged engagement portion 118 configured to engage the respective damping channel 116 of the bearing sleeve 46. Accordingly, damping elements 110a, 110b align and engage damping channels 116a, 116b, respectively on the first side 58 of the bearing sleeve 46, while damping elements 110c, 110d align and engage respective damping channels 116c, 116d on the second side 60 of the bearing sleeve 46. The engagement of the damping elements 110a, 110b, 110c, 110d mounted on the second support member 32 via the flexible collar 106 with the damping channels 116 provided on the bearing sleeve 46 of the first support member 30 has the beneficial effect of reducing unwanted vibration or looseness therebetween, while still permitting sliding action upon release of the locking mechanism 84.

As shown, the flexible collar 106 additionally includes an enlarged locking member cover position 120, and an inside surface projection 122 that extends partially into the seat 98 of the mount 94, thereby providing additional registration between the flexible collar 106 and the collar recess 108 of the second support member 32.

The flexible collar 106 may be made of any suitable flexible/elastomeric material including but not limited to saturated and unsaturated rubbers, as well as thermoplastic elastomers. To enhance location of the adjustment lock mechanism, in particular without visually locating it, selection of material for the flexible collar 106 may be based on providing a different tactile feel in comparison to the second support member body 33. Accordingly, the flexible collar 106 may be formed of a material and/or provided with a surface finish (i.e. surface features including, but not limited to ribs, dimples, protuberances, etc.) that enhance non-visual location.

Having regard to FIG. 3, second support member 32, at an upper end 124 thereof, is adapted to receive an armrest pad 20 (see FIG. 1). It will be appreciated that the armrest pad 20 may take on a variety of forms, and there is no intent to limit this disclosure to one particular form. In one exemplary embodiment, the armrest pad may be of the fixed variety where the armrest pad is provided on an anchor plate adapted for direct attachment to the upper end 124 of the second support member 32. In an alternative embodiment, the armrest pad may include a lateral position adjuster that permits the armrest pad 20 to be located through a range of lateral positions relative to the second support member 32.

The telescoping armrest assembly 18 may additionally comprise various plates and covers to improve the overall aesthetics and safety of the assembly. Having regard to FIG. 3, the telescoping armrest assembly 18 is shown as having a lateral arm cover plate 126, and a pair of lateral attachment plates 128a, 128b.

Figure 8:
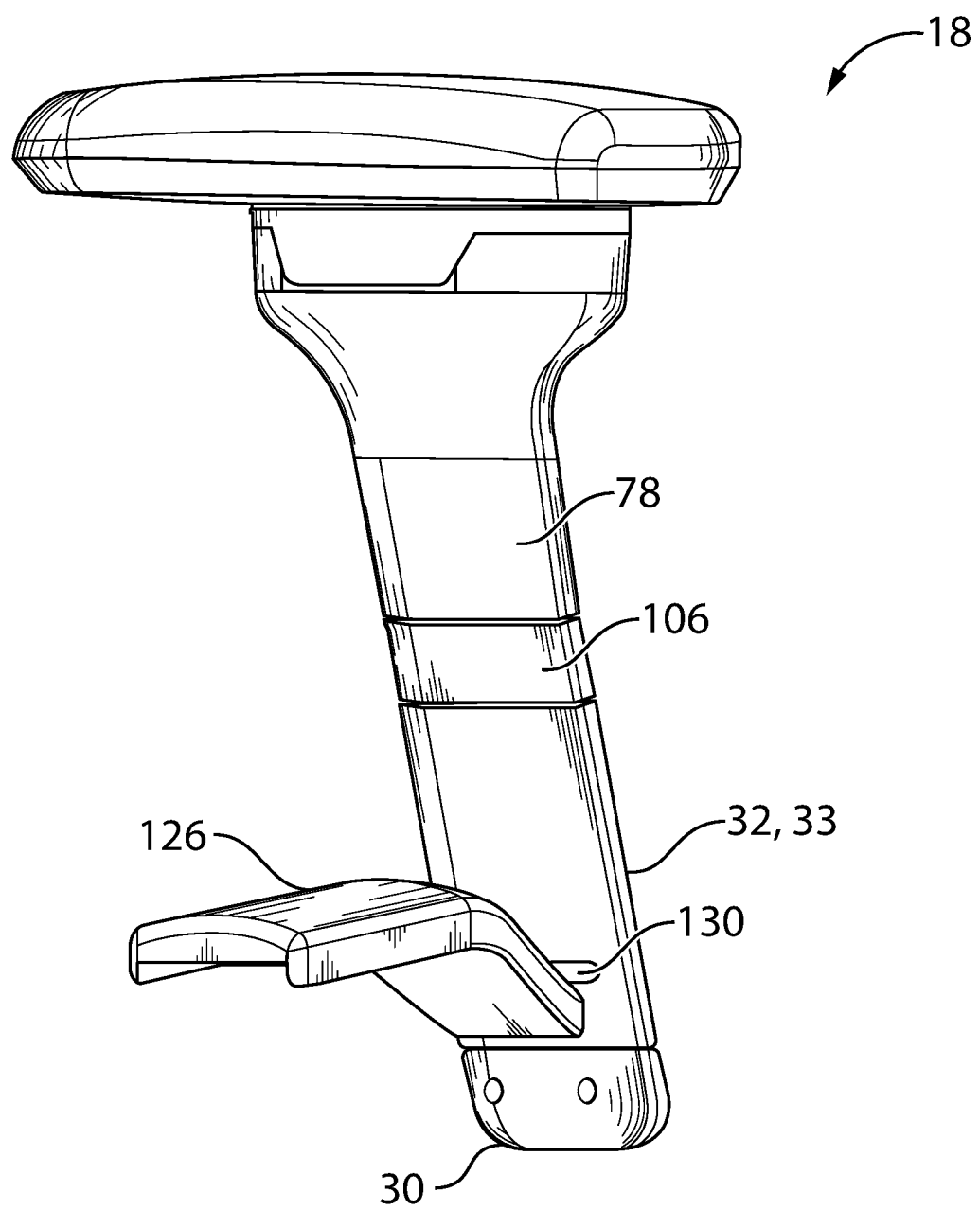
FIG. 8 is a perspective view of an alternative embodiment of the armrest assembly incorporating an additional damping insert.
Figure 9:
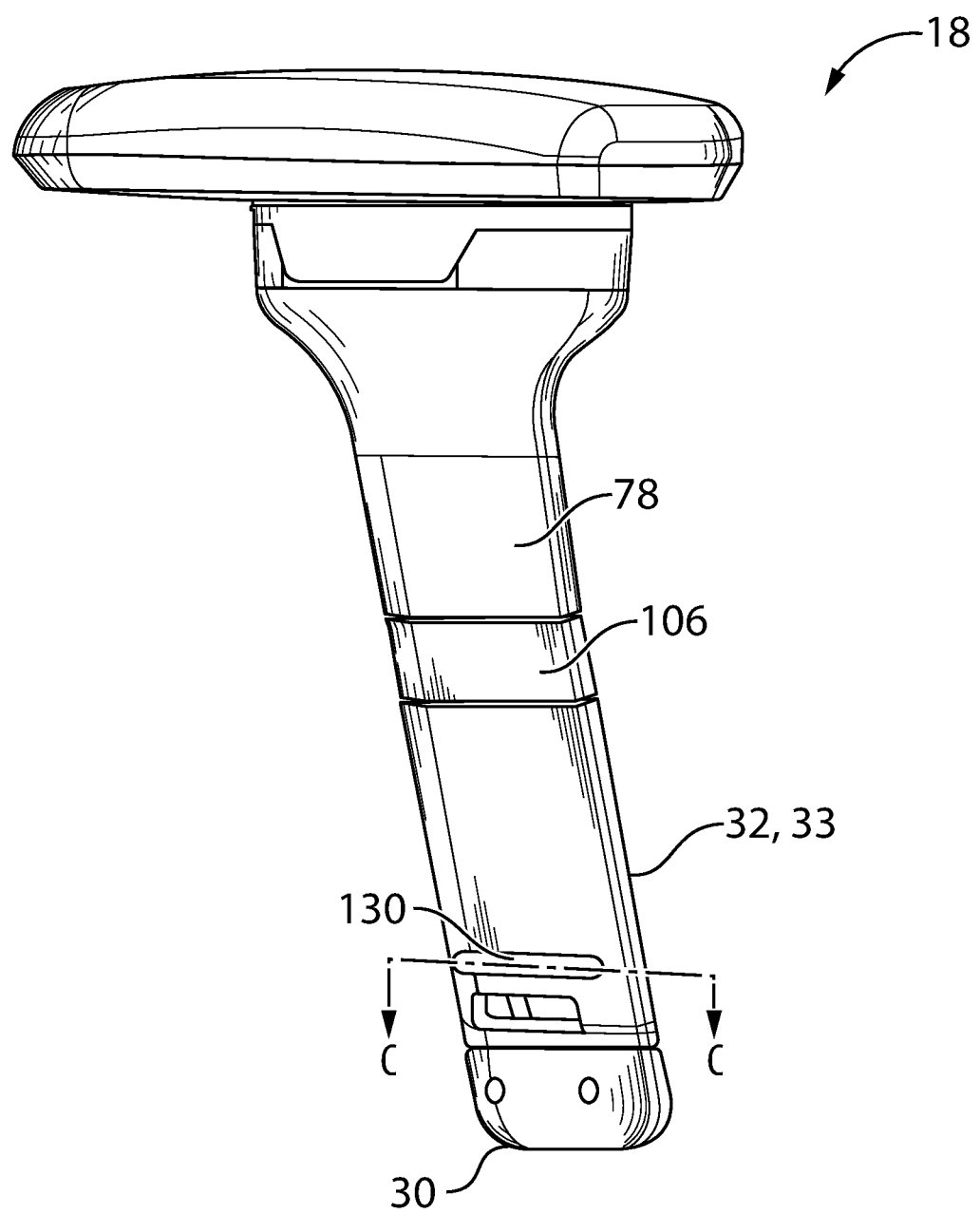
FIG. 9 is a perspective view of the armrest assembly according to the embodiment of FIG. 8, showing the armrest assembly without the lateral support arm.
Figure 10:
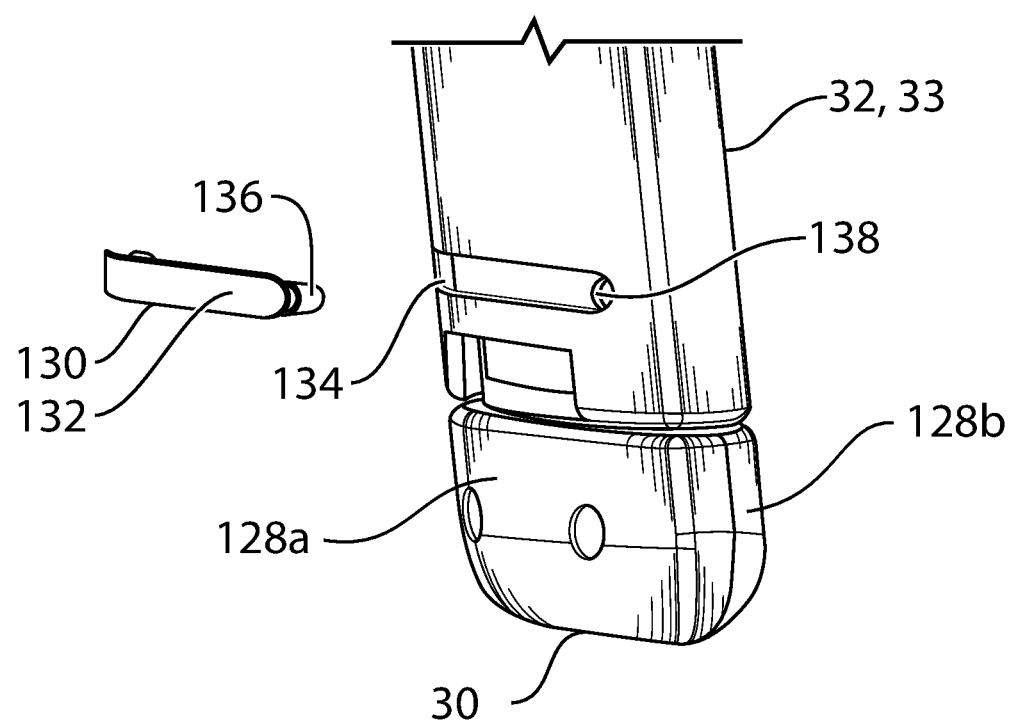
FIG. 10 is a partially exploded perspective view of the armrest assembly according to the embodiment of FIG. 8, showing features of the damping insert.
Figure 11:
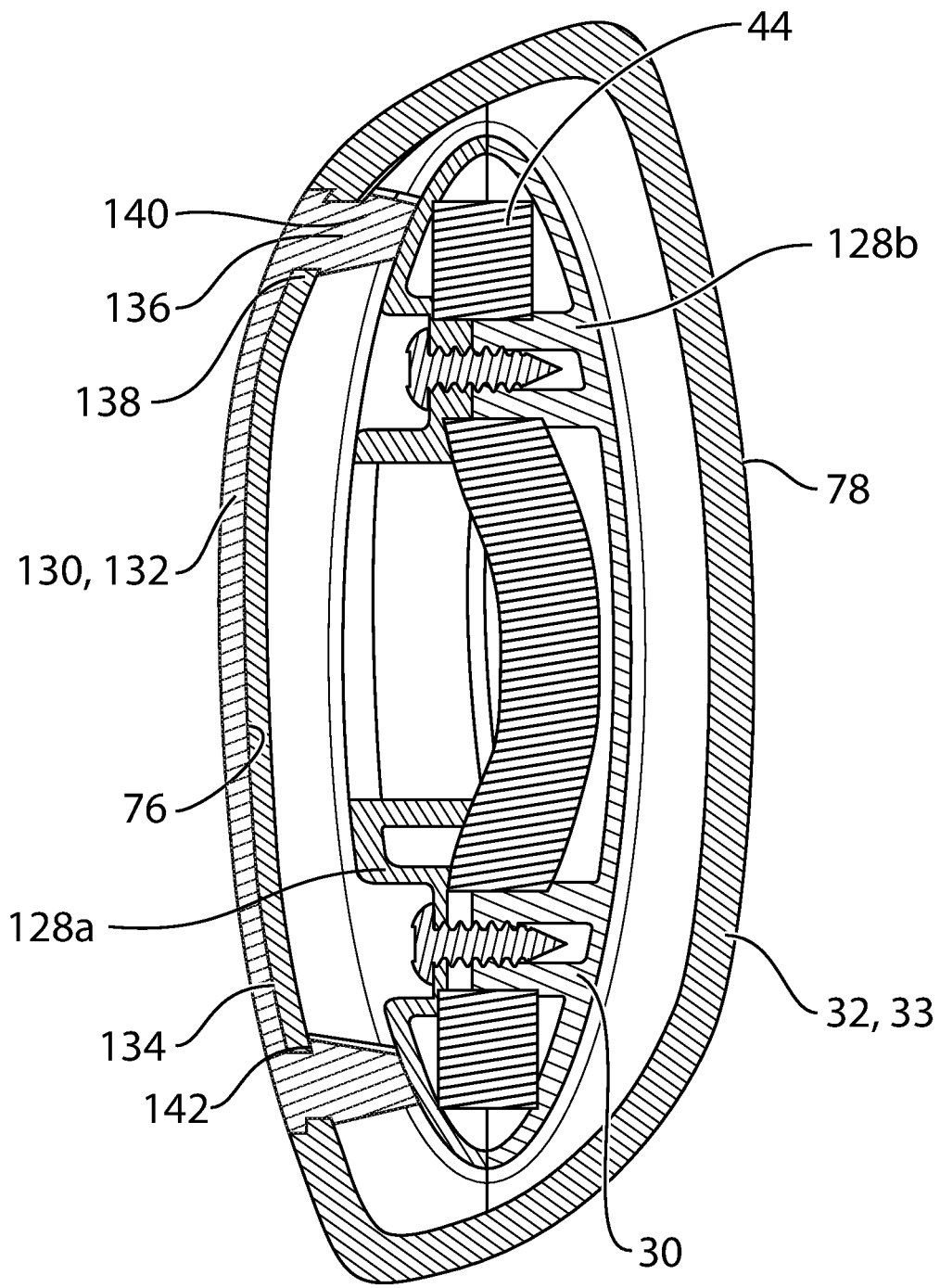
FIG. 11 is a cross-sectional view through line C-C in FIG. 9, showing the relationship between the damping insert and the first and second support members of the armrest assembly according to the embodiment of FIG. 8.

In some embodiments, the telescoping armrest assembly 18 may include one or more additional damping structures to reduce rattle and play between the first and second support members 30, 32. Having regard to FIGS. 8 through 10, shown is a telescoping armrest assembly 18 that includes an additional damping insert 130. The damping insert 130 includes an insert body 132 sized to fit a corresponding insert recess 134 provided on the body 33 of the second support member 32. The damping insert 130 also includes at least one insert damping element 136 that extends from outside the second support member 32, through a corresponding damping element aperture 138 on the second support member 32 into the interior volume and engages the first support member 30. As shown in FIG. 11, the insert damping element 136 includes at the terminus end an enlarged engagement portion 140 configured to engage the first support member 30. In the fully retracted position (as shown in FIG. 11), the enlarged engagement portion 140 of the insert damping element 136 engages the lateral attachment plate 128a of the first support member 30. During vertical extension of the telescoping armrest assembly 18, the enlarged engagement portion 140 of the insert damping element 136 may engage the bearing sleeve 46 of the first support member 30. The engagement portion 140 includes a shoulder 142 that extends behind the body 33 to engage the inside surface 76 of the second support member 32. In this way, the damping insert 130 is secured within the insert recess 134 provided on the outside surface 78 of the second support member 32.

In the embodiment shown, the damping insert 130 is elongate in form, and includes two insert damping elements 136. It will be appreciated that in some embodiments, the damping insert 130 may include only one insert damping element 136, while in other embodiments, the damping insert 130 may include three or more insert damping elements 136. The damping insert 130 is shown as being located on the second support member 32 in a lower region proximate to the lateral support arm 34. It will be appreciated that the damping insert 130 may be positioned at other locations on the second support member 32, either on the surface facing inwardly towards the seat 12 of the chair 10, or on the opposing outwardly directed surface. It will also be appreciated that a telescoping armrest assembly 18 may include more than one damping insert 130. The damping insert 130 may be made of any suitable flexible/elastomeric material including but not limited to saturated and unsaturated rubbers, as well as thermoplastic elastomers.

It will be appreciated that the adjustment mechanism disclosed above incorporates a telescoping relationship between a stationary body (the first support member 30) and a moveable component (the second support member 32). The advantages gained by incorporating the flexible collar 106 and/or the one or more damping inserts 130, namely the reduction in rattle and general play between sliding surfaces, is transferrable to other telescoping mechanisms where a smoother and generally quieter association between parts is desired. Accordingly, the disclosure may find application in fields outside that of office chairs, for example extendable rods and adjustable tripods as suggested above.

As used herein, the terms horizontal and vertical and variations thereof are to be understood with reference to the structure of the chair 10 as shown in FIG. 1. Specifically, the term horizontal refers to a direction that is generally parallel to the plane defined by the seat 12 of chair 10, while the term vertical refers to a direction that is generally perpendicular to the plane defined by the seat 12 of chair 10. Similarly, the terms upward, downward, upper, lower, as well as derivations thereof are used to refer to a relative position that is generally perpendicular to the plane the seat 12 of chair 10.

While various embodiments have been described above, it should be understood that they have been presented only as illustrations and examples of the present disclosure, and not by way of limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

The invention claimed is:

1. An adjustable armrest assembly comprising:
    a first support member (30);
    a second support member (32) including a second support member body (33) that is slidable upon the first support member (30);
    an armrest that is supported on the second support member; and
    a locking member (86) having an actuator portion;
    wherein the second support member (32) includes a flexible collar (106) that has an interior surface and an exterior surface, and covers the actuator portion with the interior surface, and extends around the second support member body, and wherein the flexible collar is flexible to permit an operator to apply a manual force from the exterior surface of the flexible collar to the actuator portion, to drive the locking member to releasably lock the second support member (32) in a selectable location relative to the first support member (30).

2. The adjustable armrest assembly according to claim 1, wherein the flexible collar is substantially flush with the body.

3. The adjustable armrest assembly according to claim 1, wherein the flexible collar has a different surface finish than the second support member body.

4. The adjustable armrest assembly according to claim 1, wherein the flexible collar has a different tactile feel than the second support member body.

* * * * *